US012413929B2

(12) United States Patent
Breebaart et al.

(10) Patent No.: US 12,413,929 B2
(45) Date of Patent: Sep. 9, 2025

(54) BINAURAL SIGNAL POST-PROCESSING

(71) Applicants: Dolby Laboratories Licensing Corporation, San Francisco, CA (US); Dolby International AB, Dublin (IE)

(72) Inventors: Dirk Jeroen Breebaart, Ultimo (AU); Giulio Cengarle, Barcelona (ES); C. Phillip Brown, Castro Valley, CA (US)

(73) Assignees: Dolby Laboratories Licensing Corporation, San Francisco, CA (US); Dolby International AB, Dublin (IE)

(*) Notice: Subject to any disclaimer, the term of this patent is extended or adjusted under 35 U.S.C. 154(b) by 125 days.

(21) Appl. No.: 18/258,041

(22) PCT Filed: Dec. 16, 2021

(86) PCT No.: PCT/US2021/063878
§ 371 (c)(1),
(2) Date: Jun. 16, 2023

(87) PCT Pub. No.: WO2022/133128
PCT Pub. Date: Jun. 23, 2022

(65) Prior Publication Data

US 2024/0056760 A1 Feb. 15, 2024

Related U.S. Application Data

(60) Provisional application No. 63/155,471, filed on Mar. 2, 2021.

(30) Foreign Application Priority Data

Dec. 17, 2020 (ES) .................................. 202031265

(51) Int. Cl.
*H04S 7/00* (2006.01)
*H04S 3/00* (2006.01)

(52) U.S. Cl.
CPC .............. *H04S 7/304* (2013.01); *H04S 3/008* (2013.01); *H04S 2400/01* (2013.01);
(Continued)

(58) Field of Classification Search
CPC . H04S 5/00; H04S 7/304; H04S 3/008; H04S 7/302; H04S 2400/01;
(Continued)

(56) References Cited

U.S. PATENT DOCUMENTS 9,414,171 B2 8/2016 Pontoppidan
9,420,375 B2 8/2016 Patwardhan
(Continued)

FOREIGN PATENT DOCUMENTS

CN 110517705 A 11/2019
JP 2017505039 A 2/2017
(Continued)

OTHER PUBLICATIONS

Baumgarte, F. et al., "Binaural cue coding-part II: schemes and applications", IEEE Transactions on Speech and Audio Processing, IEEE Service Center, New York, NY, US, vol. 11, No. 6, Nov. 1, 2003 (Nov. 1, 2003), pp. 520-531, XP011104739, 12 pages.
(Continued)

*Primary Examiner* — Paul Kim

(57) ABSTRACT

A method of audio processing includes performing spatial analysis on a binaural signal to estimate level differences and phase differences characteristic of a binaural filter of the binaural signal, performing object extraction on the binaural audio signal using the estimated level and phase differences to generate a left/right main component signal and a left/right residual component signal. The system may process the left/right main and left/right residual components differently using different object processing parameters for e.g. repositioning, equalization, compression, upmixing, channel
(Continued)

remapping or storage to generate a processed binaural signal that provides an improved listening experience. Repositioning may be based on head tracking sensor data.

17 Claims, 3 Drawing Sheets

(52) U.S. Cl.
CPC ....... *H04S 2400/11* (2013.01); *H04S 2400/13* (2013.01); *H04S 2420/01* (2013.01); *H04S 2420/07* (2013.01)

(58) Field of Classification Search
CPC ............. H04S 2400/11; H04S 2400/13; H04S 2420/01; H04S 2420/03; H04S 2420/07
USPC .......................................................... 381/303
See application file for complete search history.

(56) References Cited

U.S. PATENT DOCUMENTS

| | | | |
|---|---|---|---|
| 9,788,119 | B2 | 10/2017 | Vilermo |
| 10,327,090 | B2 | 6/2019 | Lee |
| 10,341,785 | B2 | 7/2019 | Barker |
| 10,375,496 | B2 | 8/2019 | Samuelsson |
| 10,419,867 | B2 | 9/2019 | Seo |
| 10,536,775 | B1 | 1/2020 | Sen |
| 10,757,529 | B2 | 8/2020 | Laitinen |
| 10,798,511 | B1 | 10/2020 | Sheaffer |
| 10,838,684 | B2 | 11/2020 | Tsingos |
| 11,430,463 | B2 | 8/2022 | Cengarle |
| 2012/0082322 | A1 | 4/2012 | Van Waterschoot |
| 2016/0266865 | A1 | 9/2016 | Tsingos |
| 2017/0098452 | A1 | 4/2017 | Tracey |
| 2017/0243597 | A1* | 8/2017 | Braasch .............. G10L 21/0264 |
| 2018/0324542 | A1 | 11/2018 | Jeonghun et al. |
| 2019/0110137 | A1 | 4/2019 | Udesen |
| 2019/0373398 | A1 | 12/2019 | Breebaart |
| 2020/0227052 | A1 | 7/2020 | Breebaart et al. |
| 2020/0275232 | A1 | 8/2020 | Villanueva-Barreiro |
| 2020/0374646 | A1 | 11/2020 | Lee |

FOREIGN PATENT DOCUMENTS

| | | | |
|---|---|---|---|
| JP | 2017530579 | A | 10/2017 |
| WO | 2017223110 | A1 | 12/2017 |
| WO | 2018234624 | A1 | 12/2018 |
| WO | 2019086757 | A1 | 5/2019 |
| WO | 2020221431 | A1 | 11/2020 |

OTHER PUBLICATIONS

Breebaart, J. et al., (2008). Phantom materialization: A novel method to enhance stereo audio reproduction on headphones. IEEE Trans. on Audio, Speech and Language processing vol. 16, No. 8, 1503-1511, 9 pages.

Faller, C. et al., "Binaural Reproduction of Stereo Signals Using Upmixing and Diffuse Rendering", AES Convention 131; Oct. 2011, AES, 60 East 42nd Street, Room 2520 New York 10165-2520, USA, Oct. 19, 2011 (Oct. 19, 2011), XP040567615, 8 pages.

Karthik, G. et al. "Binaural Speech Source Localization Using Template Matching of Interaural Time Difference Patterns" Apr. 15-20, 2018, "Published in: 2018 IEEE International Conference on Acoustics, Speech and Signal Processing (ICASSP) Date of Conference: Apr. 15-20, 2018, Date Added to IEEE Xplore: Sep. 13, 2018 Electronic ISSN: 2379-190X INSPEC Accession No. 18096612 DOI: 10.1109/ICASSP.2018.8462586, 5 pages."

Mi, J. et al., "Comparison of a target-equalization-cancellation approach and a localization approach to source separation" Nov. 14, 2017, The Journal of the Acoustical Society of America 142, 2933 (2017); https://doi.org/10.1121/1.5009763, 10 pages.

Mi, J., "Acoustic Source Separation Based on Target Equalization-Cancellation" Jul. 10, 2005, "ProQuest Dissertations Publishing, 2018. 10689399. ISBN: 978-0-355-74430-9 ProQuest document ID2024228266, 98 pages."

Nagel, S. et al., "Coherence-adaptive binaural cue adaptation" Proc. AES conference on audio for virtual and augmented reality, 2020, 10 pages.

Pang, C. et al. "Multitask Learning of Time-Frequency CNN for Sound Source Localization" Mar. 18, 2019, "Published in: IEEE Access ( vol. 7) pp. 40725-40737 Date of Publication: Mar. 18, 2019 Electronic ISSN: 2169-3536 INSPEC Accession No. 18576291 DOI: 10.1109/ACCESS.2019.2905617 Publisher: IEEE, 30 pages."

Raspaud, M. et al. "Binaural Source Localization by Joint Estimation of ILD and ITD" May 26, 2009, "Published in: IEEE Transactions on Audio, Speech, and Language Processing ( vol. 18, Issue: 1, Jan. 2010) pp. 68-77, Date of Publication: May 26, 2009, INSPEC Accession No. 10927053, DOI: 10.1109/TASL.2009. 2023644, 10 pages."

Sridhar, R., et al., "A Formula for Low-Frequency Interaural Level Difference" Oct. 22, 2020, AES Convention: 149 (Oct. 2020) Paper No. 10412, 6 pages.

Vinton, M. et al "Next Generation Surround Decoding and Upmixing for Consumer and Professional Applications" 57th International Conference: The Future of Audio Entertainment Technoogy—Cinema, Television and the Internet, Mar. 6, 2015, 9 pages.

Walther, A. et al."Direct-Ambient Decomposition and Upmix of Surround Signals" IEEE Workshop on Applications of Signal Processing to Audio and Acoustics, Oct. 16-19, 2011, New Paltz, NY, 4 pages.

Zannini, C. et al. "Binaural sound source localization in the presence of reverberation" Jul. 6-8, 2011. 2011 17th International Conference on Digital Signal Processing (DSP) Date of Conference: Jul. 6-8, 2011, Date Added to IEEE Xplore: Aug. 30, 2011 INSPEC Accession No. 12216954 DOI: 10.1109/ICDSP.2011.6004954 Publisher: IEEE, 6 pages.

Zhong, X. et al. "Active binaural localization of multiple sound sources" Aug. 11, 2016. "Robotics and Autonomous Systems vol. 85, Nov. 2016, pp. 83-92, 36 pages."

Zohourian M., "Binaural speaker localization and separation based on a joint ITD/ILD model and head movement tracking" Mar. 20-25, 2016, "Published in: 2016 IEEE International Conference on Acoustics, Speech and Signal Processing (ICASSP) Mar. 20-25, 2016, Date Added to IEEE Xplore: May 19, 2016, ISBN Information: Electronic ISSN: 2379-190X, INSPEC Accession No. 16021390, DOI: 10.1109/ICASSP.2016.7471711, 5 pages."

* cited by examiner

BINAURAL SIGNAL POST-PROCESSING

CROSS REFERENCE TO RELATED APPLICATIONS

The present application is a U.S. National Stage application under U.S.C. 371 of International Application No. PCT/US2021/063878, filed on Dec. 16, 2021, which claims the benefit of priority to U.S. Provisional Patent Application No. 63/155,471, filed Mar. 2, 2021, and Spanish Patent Application No. P202031265, filed Dec. 17, 2020, both of which are incorporated herein by reference.

FIELD

The present disclosure relates to audio processing, and in particular, to post-processing for binaural audio signals.

BACKGROUND

Unless otherwise indicated herein, the approaches described in this section are not prior art to the claims in this application and are not admitted to be prior art by inclusion in this section.

Audio source separation generally refers to extracting specific components from an audio mix, in order to separate or manipulate levels, positions or other attributes of an object present in a mixture of other sounds. Source separation methods may be based on algebraic derivations, using machine learning, etc. After extraction, some manipulation can be applied, possibly followed by mixing the separated component with the background audio. Also for stereo or multi-channel audio, many models exist on how to separate or manipulate objects present in the mix from a specific spatial location. These models are based on a linear, real-valued mixing model, e.g. it is assumed that the object of interest—for extraction or manipulation—is present in the mix signal by means of linear, frequency-independent gains. Said differently, for object signals $x_i$ with i the object index, and mix signals $s_j$, the assumed model uses unknown linear gains $g_{ij}$ as per Equation (1):

$$s_j = \sum_i g_{ij} x_i \tag{1}$$

Binaural audio content, e.g. stereo signals that are intended for playback on headphones, are becoming widely available. Sources for binaural audio include rendered binaural audio and captured binaural audio.

Rendered binaural audio generally refers to audio that is generated computationally. For example, object-based audio such as Dolby Atmos™ audio can be rendered for headphones by using head-related transfer functions (HRTFs) which introduce the inter-aural time and level differences (ITDs and ILDs), as well as reflections occurring in the human ear. If done correctly, the perceived object position can be manipulated to anywhere around the listener. In addition, room reflections and late reverberation may be added to create a sense of perceived distance. One product that has a binaural renderer to position sound source objects around a listener is the Dolby Atmos Production Suite™ (DAPS) system.

Captured binaural audio generally refers to audio that is generated by capturing microphone signals at the ears. One way to capture binaural audio is by placing microphones at the ears of a dummy head. Another way is enabled by the strong growth of the wireless earbuds market; because the earbuds may also contain microphones, e.g. to make phone calls, capturing binaural audio is becoming accessible for consumers.

For both rendered and captured binaural audio, some form of post processing is typically desirable. Examples of such post processing includes re-orientation or rotation of the scene to compensate for head movement; re-balancing the level of specific objects with respect to the background, e.g. to enhance the level of speech or dialogue, to attenuate background sound and room reverberation, etc.; equalization or dynamic-range processing of specific objects within the mix, or only from a specific direction, such as in front of the listener; etc.

SUMMARY

Existing systems for audio post-processing have a number of issues. One issue is that many existing signal decomposition and upmixing processes use linear gains. Although linear gains work well for channel-based signals such as stereo audio, they do not work well for binaural audio because binaural audio has frequency-dependent level and time differences. There is a need for improved upmixing processes that work well for binaural audio.

Although methods exist to re-orient or rotate binaural signals, these methods generally operate to perform relative changes due to rotation on the full mix or on the coherent element only. There is a need to separate a binaurally rendered objects from the mix and to perform different processing based on different objects.

Embodiments relate to a method to extract and process one or more objects from a binaural rendition or binaural capture. The method is centered around (1) estimation of the attributes of HRTFs that were used during rendering or present in the capture, (2) source separation based on estimation of the estimated HRTF attributes, and (3) processing of one or more of the separated sources.

According to an embodiment, a computer-implemented method of audio processing includes performing signal transformation on a binaural signal, which includes transforming the binaural signal from a first signal domain to a second signal domain, and generating a transformed binaural signal, where the first signal domain is a time domain and the second signal domain is a frequency domain. The method further includes performing spatial analysis on the transformed binaural signal, where performing the spatial analysis includes generating estimated rendering parameters, and where the estimated rendering parameters include level differences and phase differences. The method further includes extracting estimated objects from the transformed binaural signal using at least a first subset of the estimated rendering parameters, where extracting the estimated objects includes generating a left main component signal, a right main component signal, a left residual component signal, and a right residual component signal. The method further includes performing object processing on the estimated objects using at least a second subset of the estimated rendering parameters, where performing the object processing includes generating a processed signal based on the left main component signal, the right main component signal, the left residual component signal, and the right residual component signal.

As a result, the listener experience is improved due to the system being able to apply different frequency-dependent level and time differences to the binaural signal.

Generating the processed signal may include generating a left main processed signal and a right main processed signal from the left main component signal and the right main component signal using a first set of object processing parameters, and generating a left residual processed signal and a right residual processed signal from the left residual component signal and the right residual component signal using the second set of object processing parameters. The second set of object processing parameters differs from the first set of object processing parameters. In this manner, the main component may be processed differently from the residual component.

According to another embodiment, an apparatus includes a processor. The processor is configured to control the apparatus to implement one or more of the methods described herein. The apparatus may additionally include similar details to those of one or more of the methods described herein.

According to another embodiment, a non-transitory computer readable medium stores a computer program that, when executed by a processor, controls an apparatus to execute processing including one or more of the methods described herein.

The following detailed description and accompanying drawings provide a further understanding of the nature and advantages of various implementations.

DETAILED DESCRIPTION

Described herein are techniques related to audio processing. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps, even if those steps are otherwise described in another order, and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted, e.g. "either A or B", "at most one of A and B", etc.

This document describes various processing functions that are associated with structures such as blocks, elements, components, circuits, etc. In general, these structures may be implemented by a processor that is controlled by one or more computer programs.

1. Binaural Post-Processing System

As discussed in more detail below, embodiments describe a method to extract one or more components from a binaural mixture, and in addition, to estimate their position or rendering parameters that are (1) frequency dependent, and (2) include relative time differences. This allows one or more of the following: Accurate manipulation of the position of one or more objects in a binaural rendition or capture; processing of one or more objects in a binaural rendition or capture, in which the processing depends on the estimated position of each object; and source separation including estimates of position of each source from a binaural rendition or capture.

Figure 1:
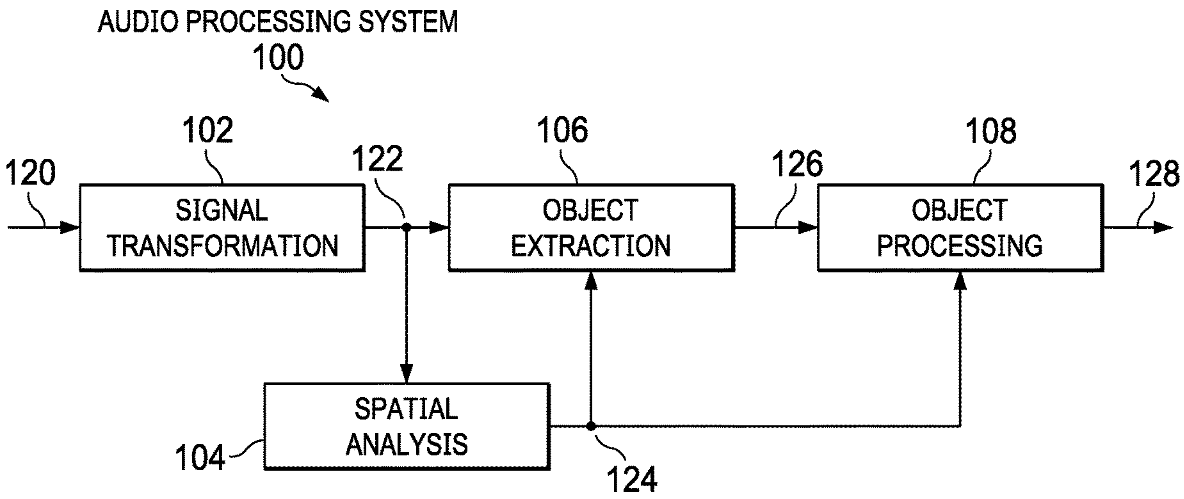
FIG. 1 is a block diagram of an audio processing system 100.

FIG. 1 is a block diagram of an audio processing system 100. The audio processing system 100 may be implemented by one or more computer programs that are executed by one or more processors. The processor may be a component of a device that implements the functionality of the audio processing system 100, such as a headset, headphones, a mobile telephone, a laptop computer, etc. The audio processing system 100 includes a signal transformation system 102, a spatial analysis system 104, an object extraction system 106, and an object processing system 108. The audio processing system 100 may include other components and functionalities that (for brevity) are not discussed in detail. In general, in the audio processing system 100, a binaural signal is first processed by the signal transformation system 102 using a time-frequency transform. Subsequently, the spatial analysis system 104 estimates rendering parameters, e.g. binaural rendering parameters, including level and time differences that were applied to one or more objects. Subsequently, these one or more objects are extracted by the object extraction system 106 and/or processed by the object processing system 108. The following paragraphs provide more details for each component.

The signal transformation system 102 receives a binaural signal 120, performs signal transformation on the binaural signal 120, and generates a transformed binaural signal 122. The signal transformation includes transforming the binaural signal 120 from a first signal domain to a second signal domain. The first signal domain may be the time domain, and the second signal domain may be the frequency domain. The signal transformation may be one of a number of time-to-frequency transforms, including a Fourier transform such as a fast Fourier transform (FFT) or discrete Fourier transform (DFT), a quadrature mirror filter (QMF) transform, a complex QMF (CQMF) transform, a hybrid CQMF (HCQMF) transform, etc. The signal transform may result in complex-valued signals.

In general, the signal transformation system 102 provides some time/frequency separation to the binaural signal 120 that results in the transformed binaural signal 122. For example, the signal transformation system 102 may transform blocks or frames of the binaural signal 120, e.g. blocks of 10-100 ms, such as 20 ms blocks. The transformed binaural signal 122 then corresponds to a set of time-frequency tiles for each transformed block of the binaural signal 120. The number of tiles depends on the number of frequency bands implemented by the signal transformation system 102. For example, the signal transformation system 102 may be implemented by a filter bank having between 10-100 bands, such as 20 bands, in which case the transformed binaural signal 122 has a like number of time-frequency tiles.

The spatial analysis system 104 receives the transformed binaural signal 122, performs spatial analysis on the transformed binaural signal 122, and generates a number of estimated rendering parameters 124. In general, the estimated rendering parameters 124 correspond to parameters for head-related transfer functions (HRTFs), head-related impulse responses (FERRO, binaural room impulse responses (BRIRs), etc. The estimated rendering parameters 124 include a number of level differences—the parameter h, as discussed in more detail below; and a number of phase differences—the parameter φ, as discussed in more detail below.

The object extraction system 106 receives the transformed binaural signal 122 and the estimated rendering parameters 124, performs object extraction on the transformed binaural signal 122 using the estimated rendering parameters 124, and generates a number of estimated objects 126. In general, the object extraction system 106 generates one object for each time-frequency tile of the transformed binaural signal 122. For example, for 100 tiles, the number of estimated objects is 100.

Each estimated object may be represented as a main component signal, represented below as x, and a residual component signal, represented below as d. The main component signal may include a left main component signal $x_l$ and a right main component signal $x_r$; the residual component signal may include a left residual component signal $d_l$ and a right residual component signal $d_r$. The estimated objects 126 then include the four component signals for each time-frequency tile.

The object processing system 108 receives the estimated objects 126 and the estimated rendering parameters 124, performs object processing on the estimated objects 126 using the estimated rendering parameters 124, and generates a processed signal 128. The object processing system 108 may use a different subset of the estimated rendering parameters 124 than those used by the object extraction system 106. The object processing system 108 may implement a number of different object processing processes, as further detailed below.

2. Spatial Analysis and Object Extraction

The audio processing system 100 may perform a number of calculations as part of performing the spatial analysis and object extraction, as implemented by the spatial analysis system 104 and the object extraction system 106. These calculations may include one or more of estimation of HRTFs, phase unwrapping, object estimation, object separation, and phase alignment.

2.1 Estimation of HRTFs

In the following we assume signals to be present in sub-bands and in time frames using a time-frequency transform that provides complex-valued signals (e.g. DFT, CQMF, HCQMF, etc.). Within each time/frequency tile, we assume we can model the complex-valued binaural signal pair (l[n],r[n]) with n a frequency or time index, as per Equations (2a-2b):

$$l[n]=h_l x[n]e^{j\phi_l}+d_l[n] \quad (2a)$$

$$r[n]=h_r x[n]e^{j\phi_r}+d_r[n] \quad (2b)$$

The complex phase angles $\phi_l$ and $\phi_r$ represent the phase shifts introduced by HRTFs within a narrow sub band; $h_l$ and $h_r$ represent the magnitudes of the FIRM applied to main component signal x; and $d_l$, $d_r$ are two unknown residual signals. In most cases, we are not interested in the absolute phase of the HRTFs $\phi_l$ and $\phi_r$; instead, the inter-aural phase difference (IPD) φ may be used. Pushing the IPD φ to the right channel signal, our signal model may be represented by Equations (3a-3b):

$$l[n]=h_l x[n]+d_l[n] \quad (3a)$$

$$r[n]=h_r x[n]e^{-j\phi}+d_r[n] \quad (3b)$$

Similarly, we might be mostly interested in an estimation of the head shadow effect (e.g. the inter-aural level difference, ILD), and we can therefore write our model using a real-valued head-shadow attenuation h, as per Equations (4a-4b):

$$l[n]=x[n]+d_l[n] \quad (4a)$$

$$r[n]=hx[n]e^{-j\phi}+d_r[n] \quad (4b)$$

We assume that the expected value of the inner product of the residual signals is zero, as per Equation (5):

$$\langle d_l d_r^* \rangle=0 \quad (5)$$

In addition, we assume that the expected value of the inner product of signal x with any of the residual signals is also zero, as per Equation (6):

$$\langle x d_l^* \rangle=\langle x d_r^* \rangle=0 \quad (6)$$

Lastly, we also require the two residual signals to have equal energy, as per Equation (7):

$$\langle d_l d_l^* \rangle=\langle d_r d_r^* \rangle=\langle d d^* \rangle \quad (7)$$

We then obtain the relative IPD phase angle φ directly as per Equation (8):

$$\phi=\angle\langle l r^* \rangle \quad (8)$$

In other words, the phase difference for each tile is calculated as the phase angle of an inner product of a left component l of the transformed binaural signal (e.g. 122 in FIG. 1) and a right component r* of the transformed binaural signal.

We then create a modified right-channel signal r' by applying the relative phase angle, as per Equation (9):

$$r'[n]=r[n]e^{+j\phi}=hx[n]+d_r[n]e^{+j\phi} \quad (9)$$

We estimate the main component $\hat{x}'$ from l[n] and r'[n] according to a weighted combination, as per Equation (10):

$$\hat{x}'[n]=w_l l[n]+w'_r r'[n] \quad (10)$$

In Equation (10), the caret or hat symbol ^ denotes an estimate, and the weight $w'_r$ may be calculated according to Equation (11):

$$w'_r=w_r e^{-j\phi} \quad (11)$$

We can formulate the cost function $E_X$ as per Equation (12):

$$E_{x'}=\|x-w_l(x+d_l)-w'_r(hx+d_r e^{+j\phi})\|^2 \quad (12)$$

Setting the partial derivatives and $$\frac{\partial E_x}{\partial w_l} \text{ and } \frac{\partial E_x}{\partial w'_r}$$

to zero gives Equations (13a-13b):

$$\frac{\partial E_x}{\partial w_l} = 2w_l\langle dd^*\rangle - 2\langle x\,x^*\rangle(1 - w_l - w'_r h) = 0 \quad (13a)$$

$$\frac{\partial E_x}{\partial w'_r} = 2w'_r\langle d\,d^*\rangle - 2h\langle x\,x^*\rangle(1 - w_l - w'_r h) = 0 \quad (13b)$$

We can then write Equations (14a-14c):

$$\langle l\,l^*\rangle = \langle x\,x^*\rangle + \langle d\,d^*\rangle \quad (14a)$$

$$\langle r'\,r'^*\rangle = \langle x\,x^*\rangle h^2 + \langle d\,d^*\rangle \quad (14b)$$

$$\langle (l + r')(l + r')^*\rangle = \langle m\,m^*\rangle = \langle x\,x^*\rangle(1+h)^2 + 2\langle d\,d^*\rangle = \langle x\,x^*\rangle\left(1 + 2h + h^2\right) + 2\langle d\,d^*\rangle \quad (14c)$$

Substitution leads to Equations (15a-15i):

$$\langle d\,d^*\rangle = \langle l\,l^*\rangle - \langle x\,x^*\rangle = \langle r'\,r'^*\rangle - \langle x\,x^*\rangle h^2 \quad (15a)$$

$$\langle x\,x^*\rangle = \frac{\langle l\,l^*\rangle - \langle r'r'^*\rangle}{1 - h^2} \quad (15b)$$

$$\langle d\,d^*\rangle = \frac{\langle l\,l^*\rangle\left(1 - h^2\right) - \langle l\,l^*\rangle + \langle r'\,r'^*\rangle}{1 - h^2} \quad (15c)$$

$$h^2(\langle m\,m^*\rangle - \langle l\,l^*\rangle - \langle r'\,r'^*\rangle) + 2h(\langle l\,l^*\rangle - \langle r'\,r'^*\rangle) - \langle m\,m^*\rangle + \langle l\,l^*\rangle + \langle r'r'^*\rangle = 0 \quad (15d)$$

$$h^2A + hB + C = 0 \quad (15e)$$

$$A = \langle m\,m^*\rangle - \langle l\,l^*\rangle - \langle r'r'^*\rangle \quad (15f)$$

$$B = 2(\langle l\,l^*\rangle - \langle r'\,r'^*\rangle) \quad (15g)$$

$$C = -\langle m\,m^*\rangle + \langle l\,l^*\rangle + \langle r'\,r'^*\rangle \quad (15h)$$

$$D = B^2 - 4AC \quad (15i)$$

Equations (15a-15i) then give us the solution for the level difference h that was present in the HRTFs, as per Equation (16):

$$h_{1,2} = \frac{-B \pm \sqrt{D}}{2A} \quad (16)$$

In other words, the level difference for each tile is computed according to a quadratic equation based on the left component of the transformed binaural signal, the right component of the transformed binaural signal, and the phase difference. An example of the left component of the transformed binaural signal is the left component of 122 in FIG. 1, and is represented by the variables l and l* in the expressions A, B and C. An example of the right component of the transformed binaural signal is the right component of 122, and is represented by the variables r' and r'* in the expressions A, B and C. An example of the phase difference is the phase difference information in the estimated rendering parameters 124, and is represented by the IPD phase angle $\phi$ in Equation (8), which is used to calculate r' as per Equation (9).

As a specific example, the spatial analysis system 104 (see FIG. 1) may estimate the HRTFs by operating on the transformed binaural signal 122 using Equations (1-16), in particular Equation (8) to generate the IPD phase angle $\phi$ and Equation (16) to generate the level difference h as part of generating the estimated rendering parameters 124.

2.2 Phase Unwrapping

In the previous section, the estimated IPD $\phi$ is always wrapped to a two-pi interval, as per Equation (8). To accurately determine the location of a given object, the phase needs to be unwrapped. In general, unwrapping refers to using neighbouring bands to determine the most likely location, given the multiple possible locations indicated by the wrapped IPD. To unwrap the phase, we can employ various strategies: evidence-based unwrapping and model-based unwrapping.

2.2.1 Evidence-Based Unwrapping

For evidence-based phase unwrapping, we can use information from neighbouring bands to derive the best estimate of the unwrapped IPD. Let us assume we have 3 IPD estimates for neighbouring sub-bands b−1, b, and b+1, denoted $\phi_{b-1}$, $\phi_b$, $\phi_{b+1}$. The unwrapped phase candidates $\hat{\phi}_b$ for band b are then given by Equation (17):

$$\hat{\phi}_{b,N_b} = \phi_b + 2N_b\pi \quad (17)$$

Each candidate $\hat{\phi}_{b,N_b}$ has an associated ITD $\hat{\tau}_{b,N}$ as per Equation (18):

$$\hat{\tau}_{b,N_b} = \frac{\hat{\phi}_{b,N_b}}{2\pi f_b} \quad (18)$$

In Equation (18), $f_b$ represents the center frequency of band b. We also have an estimate of the main component total energy in each band $\sigma_b^2$, which is given by Equation (19):

$$\sigma_b^2 = (1 + h_b^2)\langle x_b x_b^*\rangle \quad (19)$$

Hence cross-correlation function denoted $R_b(\tau)$ for band b as a function of ITD $\tau$ for our main component $x_b$ in that band can be modelled as per Equation (20):

$$R_b(\tau) \cong \sigma_b^2 \cos(2\pi f_b(\tau - \hat{\tau}_{b,N_b})) = \sigma_b^2 \cos(2\pi f_b(\tau - \tau_{b,N_b=0})) \quad (20)$$

We can now accumulate energy across neighbouring bands v for each unwrapped IPD candidate and take the maximum as an estimate that accounts for most energy with a single ITD across bands, as per Equation (21):

$$\hat{N}_b = \underset{N}{\text{argmax}} \sum_v R_v\left(\hat{\tau}_{b,N_b}\right) \quad (21)$$

In other words, the system estimates, in each band, the total energy of the left main component signal and the right main component signal; computes a cross-correlation based on each band; and selecting the appropriate phase difference for each band according to the energy across neighbouring bands based on the cross-correlation.

2.2.2 Model-Based Unwrapping

For model-based unwrapping, given an estimate of the head shadow parameter h, for example as per Equation (16), we can use a simple HRTF model (for example a spherical head model) to find the best value of $\hat{N}_b$ given a value of h in band b. In other words, we find the best unwrapped phase that matches the magnitude of the given head shadow magnitude. This unwrapping may be performed computationally given the model and the values for h in the various bands. In other words, the system selects the appropriate phase differences for a given band from a number of candidate phase differences according to the level difference for the given band applied to a head-related transfer function.

As a specific example, for both types of unwrapping, the spatial analysis system 104 (see FIG. 1) may perform the phase unwrapping as part of generating the estimated rendering parameters 124.

2.3 Main Object Estimation

Following our estimates of $\langle x x^* \langle , \rangle d d^* \rangle$, and h—as per Equations (15a), (15b) and (16)—we can compute the weights $w_l$, $w'_r$. See also Equations (10-11). Repeating Equations (13a-13b) from above as Equations (22a-22b):

$$\frac{\partial E_x}{\partial w_l} = 2w_l\langle d\,d^*\rangle - 2\langle x\,x^*\rangle(1 - w_l - w'_r h) = 0 \tag{22a}$$

$$\frac{\partial E_x}{\partial w'_r} = 2w'_r\langle d\,d^*\rangle - 2h\langle x\,x^*\rangle(1 - w_l - w'_r h) = 0 \tag{22b}$$

The weights $w_l$, $w'_r$ may then be calculated as per Equations (23a-23b):

$$w'_r = \frac{h\langle x\,x^*\rangle(1 - w_l)}{\langle d\,d^*\rangle + h^2\langle x\,x^*\rangle} \tag{23a}$$

$$w_l = \frac{\langle x\,x^*\rangle}{\langle d\,d^*\rangle + \langle x\,x^*\rangle\left(h^2 + 1\right)} \tag{23b}$$

As a specific example, the spatial analysis system 104 (see FIG. 1) (see FIG. 1) may perform the main object estimation by generating the weights as part of generating the estimated rendering parameters 124.

2.4 Separation of Main Object and Residuals

The system may estimate two binaural signal pairs: one for the rendered main component, and the other pair for the residual. The rendered main component pair may be represented as per Equations (24a-24b):

$$l_x[n]=\hat{x}[n]=w_l l[n]+w_r r[n]=w_l l[n]+w'_r e^{+j\phi} r[n] \tag{24a}$$

$$r_x[n]=h\hat{x}[n]e^{-j\phi}=h(w_l l[n]+w'_r e^{+j\phi} r[n])e^{-j\phi}=hw_l l[n]e^{-j\phi}+hw'_r r[n] \tag{24b}$$

Figure 2:
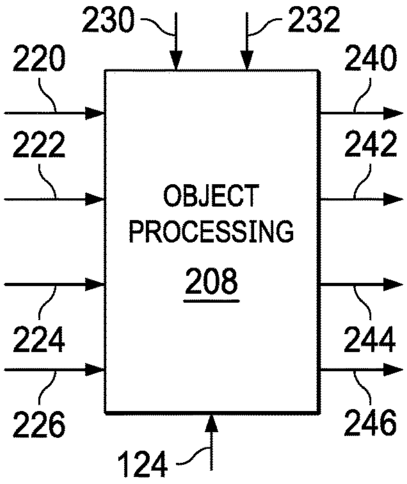
FIG. 2 is a block diagram of an object processing system 208.

In Equations (24a-24b), the signal $l_x[n]$ corresponds to the left main component signal (e.g., 220 in FIG. 2) and the signal $r_x[n]$ corresponds to the right main component signal (e.g., 222 in FIG. 2). Equations (24a-24b) may be represented by an upmix matrix M as per Equation (25):

$$\begin{bmatrix} l_x[n] \\ r_x[n] \end{bmatrix} = \begin{bmatrix} w_l & w'_r e^{+j\phi} \\ hw_l e^{-j\phi} & hw'_r \end{bmatrix}\begin{bmatrix} l[n] \\ r[n] \end{bmatrix} = M\begin{bmatrix} l[n] \\ r[n] \end{bmatrix} = \begin{bmatrix} w_l & w_r \\ hw_l e^{-j\phi} & hw_r e^{-j\phi} \end{bmatrix}\begin{bmatrix} l[n] \\ r[n] \end{bmatrix} \tag{25}$$

The residual signals $l_d[n]$ and $r_d[n]$ may be estimated as per Equation (26):

$$\begin{bmatrix} l_d[n] \\ r_d[n] \end{bmatrix} = D\begin{bmatrix} l[n] \\ r[n] \end{bmatrix} \tag{26}$$

In Equation (26), the signal $l_d[n]$ corresponds to the left residual component signal (e.g., 224 in FIG. 2) and the signal $r_d[n]$ corresponds to the right residual component signal (e.g., 226 in FIG. 2).

A perfect reconstruction requirement gives us an expression for D as per Equation (27):

$$D=I-M \tag{27}$$

In Equation (27), I corresponds to the identity matrix.

As a specific example, the object extraction system 106 (see FIG. 1) may perform the main object estimation as part of generating the estimated objects 126. The estimated objects 126 may then be provided to the object processing system (e.g., 108 in FIG. 1, 208 in FIG. 2, etc.), for example as the component signals 220, 222, 224 and 226 (see FIG. 2).

2.5 Overall Phase Alignment

So far all phase alignment is applied to the right channel and the right-channel prediction coefficient. See, e.g., Equation (9). To get a more balanced distribution, one strategy is to align the phase of the extracted main component and the residual to the downmix m as per the equation m=l+r. The phase shift θ to be applied to the two prediction coefficients would then be as per Equation (28):

$$\theta=\angle\langle m\hat{x}^*\rangle=\angle\langle (l+r)(w_l l+w_r r)^*\rangle=w_l\langle ll^*\rangle+w_r^*\langle rr^*\rangle+w_r^*\langle l_r^*\rangle+w_l^*\langle lr^*\rangle^* \tag{28}$$

The weight equations of Equations (10) and (23a-23b) are then modified using the phase shift θ to give the final prediction coefficients for our signal $\hat{x}_\theta$ as per Equations (29a-29b):

$$w_{l,\theta}=w_l e^{+j\theta} \tag{29a}$$

$$w_{r,\theta}=w_r e^{j\theta}=w'_r e^{+j\phi}e^{+j\theta} \tag{29b}$$

This results in a modification of Equation (25) to result in Equation (30):

$$\begin{bmatrix} I_{x,\theta}[n] \\ r_{x,\theta}[n] \end{bmatrix} = e^{-j\theta}\begin{bmatrix} w_{l,\theta} & w_{r,\theta} \\ w_{l,\theta}e^{-j\phi} & hw_{r,\theta}e^{-j\phi} \end{bmatrix}\begin{bmatrix} l[n] \\ r[n] \end{bmatrix} = \begin{bmatrix} w_l & w'_r e^{+j\phi} \\ w_l e^{-j\phi} & hw'_r \end{bmatrix}\begin{bmatrix} l[n] \\ r[n] \end{bmatrix} = \begin{bmatrix} l_x[n] \\ r_x[n] \end{bmatrix} \tag{30}$$

Hence the submix extraction matrix M does not change as a result of θ, but the prediction coefficients to calculate $\hat{x}_\theta$ do depend on θ, as per Equation (31):

$$\hat{x}_\theta=w_{l,\theta}l[n]+w_{r,\theta}r[n]=w_l e^{+j\theta}l[n]+w'_r e^{+j\phi}e^{+j\theta}r[n] \tag{31}$$

Finally, a re-render of $\hat{x}_\theta$ is given by Equation (32):

$$\begin{bmatrix} l_{x,\theta}[n] \\ r_{x,\theta}[n] \end{bmatrix} = \hat{x}_\theta e^{-j\theta}\begin{bmatrix} 1 \\ he^{-j\phi} \end{bmatrix} \tag{32}$$

As a specific example, the spatial analysis system 104 (see FIG. 1) may perform part of the overall phase alignment as part of generating the weights as part of generating the estimated rendering parameters 124, and the object extraction system 106 may perform part of the overall phase alignment as part of generating the estimated objects 126.

3. Object Processing

As mentioned above, the object processing system 108 may implement a number of different object processing processes. These object processing processes include one or more of repositioning, level adjustment, equalization, dynamic range adjustment, de-essing, multi-band compression, immersiveness improvement, envelopment, upmixing, conversion, channel remapping, storage, and archival. Repositioning generally refers to moving one or more identified objects in the perceived audio scene, for example by adjusting the HRTF parameters of the left and right component signals in the processed binaural signal. Level adjustment generally refers to adjusting the level of one or more identified objects in the perceived audio scene. Equalization generally refers to adjusting the timbre of one or more identified objects by applying frequency-dependent gains. Dynamic range adjustment generally refers to adjusting the loudness of one or more identified objects to fall within a defined loudness range, for example to adjust speech sounds so that near talkers are not perceived as being too loud and far talkers are not perceived as being too quiet. De-essing generally refers to sibilance reduction, for example to reduce the listener's perception of harsh consonant sounds such as "s", "sh", "x", "ch", "t", and "th". Multi-band compression generally refers to applying different loudness adjustments to different frequency bands of one or more identified objects, for example to reduce the loudness and loudness range of noise bands and to increase the loudness of speech bands. Immersiveness improvement generally refers to adjusting the parameters of one or more identified objects to match other sensory information such as video signals, for example to match a moving sound to a moving 3-dimensional collection of video pixels, to adjust the wet/dry balance so that the echoes correspond to the perceived visual room size, etc. Envelopment generally refers to adjusting the position of one or more identified objects to increase the perception that sounds are originating all around the listener. Upmixing, conversion and channel remapping generally refer to changing one type of channel arrangement to another type of channel arrangement. Upmixing generally refers to increasing the number of channels of an audio signal, for example to upmix a 2-channel signal such as binaural audio to a 12-channel signal such as 7.1.4-channel surround sound. Conversion generally refers to reducing the number of channels of an audio signal, for example to convert a 6-channel signal such as 5.1-channel surround sound to a 2-channel signal such as stereo audio. Channel remapping generally refers to an operation that includes both upmixing and conversion. Storage and archival generally refer to storing the binaural signal as one or more extracted objects with associated metadata, and one binaural residual signal.

Various audio processing systems and tools may be used to perform the object processing processes. Examples of such audio processing systems include the Dolby Atmos Production Suite™ (DAPS) system, the Dolby Volume™ system, the Dolby Media Enhance™ system, a Dolby™ mobile capture audio processing system, etc.

The following figures provide more details for object processing in various embodiments of the audio processing system 100.

FIG. 2 is a block diagram of an object processing system 208. The object processing system 208 may be used as the object processing system 108 (see FIG. 1).

The object processing system 208 receives a left main component signal 220, a right main component signal 222, a left residual component signal 224, a right residual component signal 226, a first set of object processing parameters 230, a second set of object processing parameters 232, and the estimated rendering parameters 124 (see FIG. 1). The component signals 220, 222, 224 and 226 are component signals corresponding to the estimated objects 126 (see FIG. 1). The estimated rendering parameters 124 include the level differences and phase differences computed by the spatial analysis system 104 (see FIG. 1).

The object processing system 208 uses the object processing parameters 230 to generate a left main processed signal 240 and a right main processed signal 242 from the left main component signal 220 and the right main component signal 222. The object processing system 208 uses the object processing parameters 232 to generate a left residual processed signal 244 and a right residual processed signal 246 from the left residual component signal 224 and the right residual component signal 226. The processed signals 240, 242, 244 and 246 correspond to the processed signal 128 (see FIG. 1). The object processing system 208 may perform direct feed processing, e.g. generating the left (or right) main (or residual) processed signal from only the left (or right) main (or residual) component signal. The object processing system 208 may perform cross feed processing, e.g. generating the left (or right) main (or residual) processed signal from both the left and right main (or residual) component signals.

The object processing system 208 may use one or more of the level differences and one or more of the phase differences in the estimated rendering parameters 124 when generating one of more of the processed signals 240, 242, 244 and 246, depending on the specific type of processing performed. As one example, repositioning uses at least some, e.g. all, of the level differences and at least some, e.g. all, of the phase differences. As another example, level adjustment uses at least some, e.g. all, of the level differences and less than all, e.g. none, of the phase differences. As another example, repositioning uses less than all, e.g. none, of the level differences and at least some, e.g. low frequencies such as below 1.5 kHz, of the phase differences. Using only the low frequencies is acceptable because the inter-channel phase differences above these frequencies do not contribute much to where a source is perceived, but changing the phase can result in audible artifacts. It can therefore be a better trade-off between audio quality and perceived location to only adjust low-frequency phase differences and keep the high-frequency phase differences as-is.

The object processing parameters 230 and 232 enable the object processing system 208 to use one set of parameters for processing the main component signals 220 and 222, and to use another set of parameters for processing the residual component signals 224 and 226. This allows for differential processing of the main and residual components when performing the different object processing processes discussed above. For example, for repositioning, the main components can be repositioned as determined by the object processing parameters 230, wherein the object processing parameters 232 are such that the residual components are unchanged. As another example, for multi-band compression, bands of the main components can be compressed using the object processing parameters 230, and bands of the residual components can be compressed using the different object processing parameters 232.

The object processing system 208 may include additional components to perform additional processing steps. One additional component is an inverse transformation system. The inverse transformation system performs an inverse transformation on the processed signals 240, 242, 244 and 246 to generate a processed signal in the time domain. The inverse transformation is an inverse of the transformation performed by the signal transformation system 102 (see FIG. 1).

Another additional component is a time domain processing system. Some audio processing techniques work well in the time domain, such as delay effects, echo effects, reverberation effects, pitch shifting and timbral modification. Implementing the time domain processing system after the inverse transformation system enables the object processing system 208 to perform time domain processing on the processed signal to generate a modified time domain signal.

The details of the object processing system 208 may be otherwise similar to those of the object processing system 108.

Figure 3A:
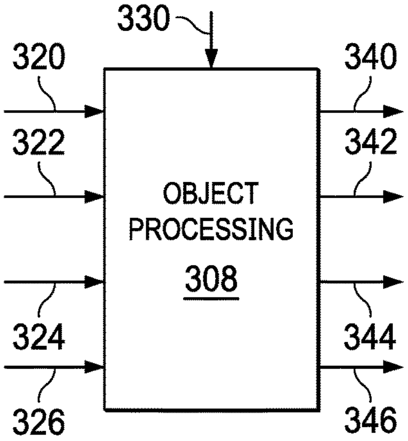
FIGS. 3A-3B illustrate embodiments of the object processing system 108 (see FIG. 1) related to re-rendering.
Figure 3B:
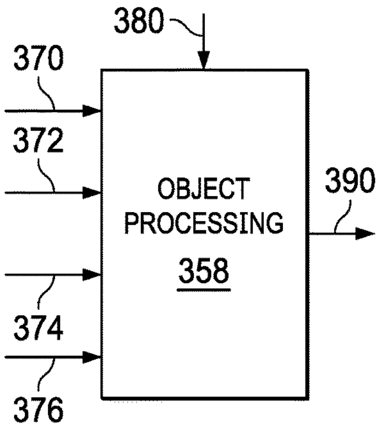

FIGS. 3A-3B illustrate embodiments of the object processing system 108 (see FIG. 1) related to re-rendering. FIG. 3A is a block diagram of an object processing system 308, which may be used as the object processing system 108. The object processing system 308 receives a left main component signal 320, a right main component signal 322, a left residual component signal 324, a right residual component signal 326 and sensor data 330. The component signals 320, 322, 324 and 326 are component signals corresponding to the estimated objects 126 (see FIG. 1). The sensor data 330 corresponds to data generated by a sensor such as a gyroscope or other type of headtracking sensor, located in a device such as a headset, headphones, an earbud, a microphone, etc.

The object processing system 308 uses the sensor data 330 to generate a left main processed signal 340 and a right main processed signal 342 based on the left main component signal 320 and the right main component signal 322. The object processing system 308 generates a left residual processed signal 344 and a right residual processed signal 346 without modification from the sensor data 330. The object processing system 308 may use direct feed processing or cross feed processing in a manner similar to that of the object processing system 208 (see FIG. 2). The object processing system 308 may use binaural panning to generate the main processed signals 340 and 342. In other words, the main component signals 320 and 322 are treated as an object to which the binaural panning is applied, and the diffuse sounds in the residual component signals 324 and 326 are unchanged.

Alternatively, the object processing system 308 may generate a monaural object from the left main component signal 320 and the right main component signal 322, and may use the sensor data 330 to perform binaural panning on the monaural object. The object processing system 308 may use a phase-aligned downmix to generate the monaural object.

Furthermore, as headtracking systems are becoming a common feature of high-end earbuds and headphone products, it is possible to know in real time the orientation of the listener and to rotate the scene accordingly, for example in virtual reality, augmented reality, or other immersive media applications. However, unless an object-based presentation is available, the effectiveness and quality of rotation methods on a rendered binaural presentation is limited. To address this issue, the object extraction system 106 (see FIG. 1) separates the main component and estimates its position, and the object processing system 308 treats the main component as an object and applies the binaural panning, while at the same time leaving the diffuse sounds in the residual untouched. This enables the following applications.

One application is the object processing system 308 rotating an audio scene according to the listener's perspective while maintaining accurate localization conveyed by the objects without compromising the spaciousness in the audio scene conveyed by the ambience in the residual.

Another application is the object processing system 308 compensating unwanted head rotations that took place while recording with binaural earbuds or microphones. The head rotations may be inferred from the positions of the main component. For example, if one assumes that the main component was supposed to remain still, every detected change of position can be compensated. The head rotations may also be inferred by acquiring headtracking data in sync with the audio recording.

FIG. 3B is a block diagram of an object processing system 358, which may be used as the object processing system 108 (see FIG. 1). The object processing system 358 receives a left main component signal 370, a right main component signal 372, a left residual component signal 374, a right residual component signal 376 and configuration information 380. The component signals 370, 372, 374 and 376 are component signals corresponding to the estimated objects 126 (see FIG. 1). The configuration information 380 corresponds to a channel layout for upmixing, conversion or channel remapping.

The object processing system 358 uses the configuration information 380 to generate a multi-channel output signal 390. The multi-channel output signal 390 then corresponds to a specific channel layout as specified in the configuration information 380. For example, when the configuration information 380 specifies upmixing to 5.1-channel surround sound, the object processing system performs upmixing to generate the six channels of the 5.1-channel surround sound channel signal from the component signals 370, 372, 374 and 376.

More specifically, the playback of binaural recordings through loudspeaker layouts poses some challenges if one wishes to retain the spatial properties of the recording. Typical solutions involve cross-talk cancellation and tend to be effective only over very small listening areas in front of the loudspeakers. By using the main and residual separation, and inferring the position of the main component, the object processing system 358 is able to treat the main component as a dynamic object with an associated position over time, which can be rendered accurately to a variety of loudspeaker layouts. The object processing system 358 may process the diffuse component using a 2-to-N channel upmixer to form an immersive channel-based bed; together, the dynamic object resulting from the main components and the channel-based bed resulting from the residual components results in an immersive presentation of the original binaural recording over any set of loudspeakers. An example system for generating the upmix of the diffuse content may be as described in the following document, where the diffuse content is decorrelated and distributed according to an orthogonal matrix: Mark Vinton, David McGrath, Charles Robinson and Phillip Brown, "Next Generation Surround Decoding and Upmixing for Consumer and Professional Applications", in 57th International Conference: The Future of Audio Entertainment Technology—Cinema, Television and the Internet (March 2015).

The advantage of this time-frequency decomposition over many existing systems is that the re-panning can vary by object, rather than rotating the entire sound field as the head moves. Additionally, in many existing systems, excess inter-aural time delay (ITD) is added to the signal, which can lead to larger-than-natural delays. The object processing system 358 helps to overcome these issues as compared to these existing systems.

Figure 4:
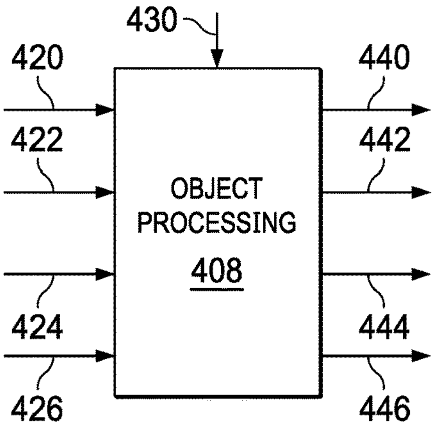
FIG. 4 is a block diagram of an object processing system 408.

FIG. 4 is a block diagram of an object processing system 408, which may be used as the object processing system 108 (see FIG. 1). The object processing system 408 receives a left main component signal 420, a right main component signal 422, a left residual component signal 424, a right residual component signal 426 and configuration information 430. The component signals 420, 422, 424 and 426 are component signals corresponding to the estimated objects 126 (see FIG. 1). The configuration information 430 corresponds to configuration settings for speech improvement processing.

The object processing system 408 uses the configuration information 430 to generate a left main processed signal 440 and a right main processed signal 442 based on the left main component signal 420 and the right main component signal 422. The object processing system 408 generates a left residual processed signal 444 and a right residual processed signal 446 without modification from the configuration information 430. The object processing system 408 may use direct feed processing or cross feed processing in a manner similar to that of the object processing system 208 (see FIG. 2). The object processing system 408 may use manual speech improvement processing parameters provided by the configuration information 430, or the configuration information 430 may correspond to settings for automatic processing by a speech improvement processing system such that as described in International Application Pub. No. WO 2020/014517. In other words, the main component signals 420 and 422 are treated as an object to which the speech improvement processing is applied, and the diffuse sounds in the residual component signals 424 and 426 are unchanged.

More specifically, binaural recordings of speech content such as podcasts and video-logs often contain contextual ambience sounds alongside the speech, such as crowd noise, nature sounds, urban noise, etc. It is often desirable to improve the quality of speech, e.g. its level, tonality and dynamic range, without affecting the background sounds. The separation into main and residual components allows the object processing system 408 to perform independent processing; level, equalization, sibilance reduction and dynamic range adjustments can be applied to the main components based on the configuration information 430. After processing, the object processing system 408 recombines the signals into the processed signals 440, 442, 444 and 446 to form an enhanced binaural presentation.

Figure 5:
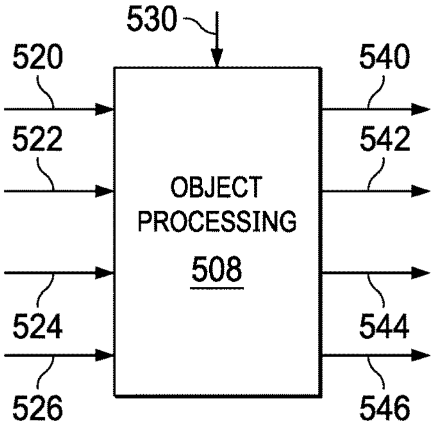
FIG. 5 is a block diagram of an object processing system 508.

FIG. 5 is a block diagram of an object processing system 508, which may be used as the object processing system 108 (see FIG. 1). The object processing system 508 receives a left main component signal 520, a right main component signal 522, a left residual component signal 524, a right residual component signal 526 and configuration information 530. The component signals 520, 522, 524 and 526 are component signals corresponding to the estimated objects 126 (see FIG. 1). The configuration information 530 corresponds to configuration settings for level adjustment processing.

The object processing system 508 uses a first set of level adjustment values in the configuration information 530 to generate a left main processed signal 540 and a right main processed signal 542 based on the left main component signal 520 and the right main component signal 522. The object processing system 508 uses a second set of level adjustment values in the configuration information 530 to generate a left residual processed signal 540 and a right residual processed signal 542 based on the left residual component signal 520 and the right residual component signal 522. The object processing system 508 may use direct feed processing or cross feed processing in a manner similar to that of the object processing system 208 (see FIG. 2).

More specifically, recordings done in reverberant environments such as large indoors spaces, rooms with reflective surfaces, etc. may contain a significant amount of reverberation, especially when the sound source of interest is not in close proximity to the microphone. An excess of reverberation can degrade the intelligibility of the sound sources. In binaural recordings, reverberation and ambience sounds, e.g. un-localized noise from nature or machinery, tend to be uncorrelated in the left and right channels, therefore remain predominantly in the residual signal after applying the decomposition. This property allows the object processing system 508 to control the amount of ambience in the recording, e.g. the amount of perceived reverberation, by controlling the relative level of the main and residual components, and then summing them into a modified binaural signal. The modified binaural signal then has e.g. less residual to enhance the intelligibility, or less main component to enhance the perceived immersiveness.

The desired balance between main and residual components as set by the configuration information 530 can be defined manually, e.g. by controlling a fader or "balance" knob, or it can be obtained automatically, based on the analysis of their relative level, and the definition of a desired balance between their levels. In one embodiment, such analysis is the comparison of the root-mean-square (RMS) level of the main and residual components across the entire recording. In another embodiment, the analysis is done adaptively over time, and the relative level of main and residual signals is adjusted accordingly in a time-varying fashion. For speech content, the process can be preceded by content analysis such as voice activity detection, to modify the relative balance of main and residual components during the speech or non-speech parts in a different way.

4. Hardware and Software Details

The following paragraphs describe various hardware and software details related to the binaural-post processing discussed above.

Figure 6:
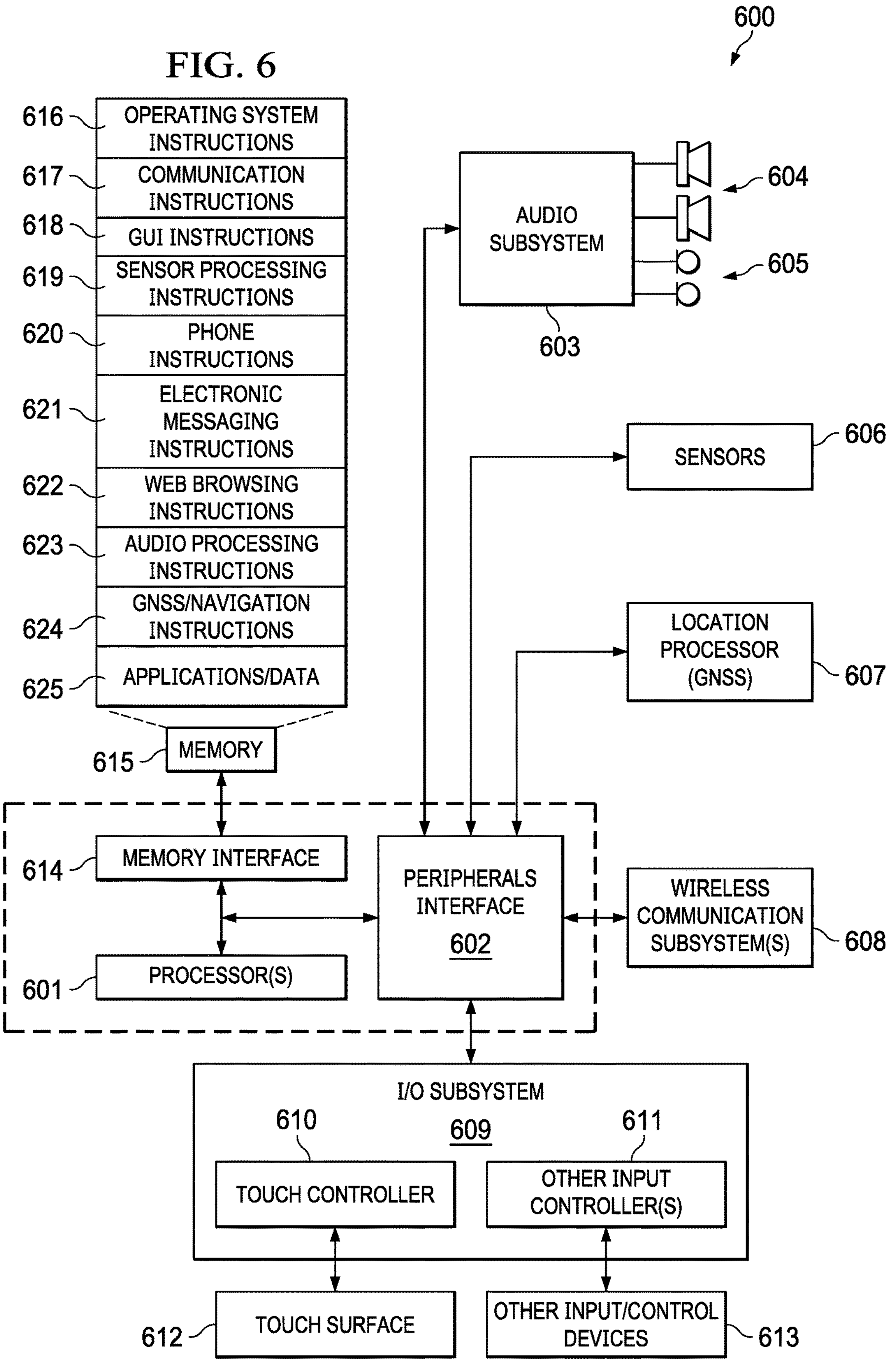
FIG. 6 is a device architecture 600 for implementing the features and processes described herein, according to an embodiment.

FIG. 6 is a device architecture 600 for implementing the features and processes described herein, according to an embodiment. The architecture 600 may be implemented in any electronic device, including but not limited to: a desktop computer, consumer audio/visual (AV) equipment, radio broadcast equipment, mobile devices, e.g. smartphone, tablet computer, laptop computer, wearable device, etc. In the example embodiment shown, the architecture 600 is for a laptop computer and includes processor(s) 601, peripherals interface 602, audio subsystem 603, loudspeakers 604, microphone 605, sensors 606, e.g. accelerometers, gyros, barometer, magnetometer, camera, etc., location processor 607, e.g. GNSS receiver, etc., wireless communications subsystems 608, e.g. Wi-Fi, Bluetooth, cellular, etc., and I/O subsystem(s) 609, which includes touch controller 610 and other input controllers 611, touch surface 612 and other input/control devices 613. Other architectures with more or fewer components can also be used to implement the disclosed embodiments.

Memory interface 414 is coupled to processors 601, peripherals interface 602 and memory 615, e.g., flash, RAM, ROM, etc. Memory 615 stores computer program instructions and data, including but not limited to: operating system instructions 616, communication instructions 617, GUI instructions 618, sensor processing instructions 619, phone instructions 620, electronic messaging instructions 621, web browsing instructions 622, audio processing instructions 623, GNSS/navigation instructions 624 and applications/data 625. Audio processing instructions 623 include instructions for performing the audio processing described herein.

According to an embodiment, the architecture 600 may correspond to a computer system such as a laptop computer that implements the audio processing system 100 (see FIG. 1), one or more of the object processing systems described herein (e.g., 208 in FIG. 2, 308 in FIG. 3A, 358 in FIG. 3B, 408 in FIG. 4, 508 in FIG. 5, etc.), etc.

According to an embodiment, the architecture 600 may correspond to multiple devices; the multiple devices may communicate via wired or wireless connection such as an IEEE 802.15.1 standard connection. For example, the architecture 600 may correspond to a computer system or mobile telephone that implements the processor(s) 601 and a headset that implements the audio subsystem 603, such as loudspeakers; one or more of the sensors 606, such as gyroscopes or other headtracking sensors; etc. As another example, the architecture 600 may correspond to a computer system or mobile telephone that implements the processor(s) 601 and earbuds that implement the audio subsystem 603, such as a microphone and loudspeakers, etc.

Figure 7:
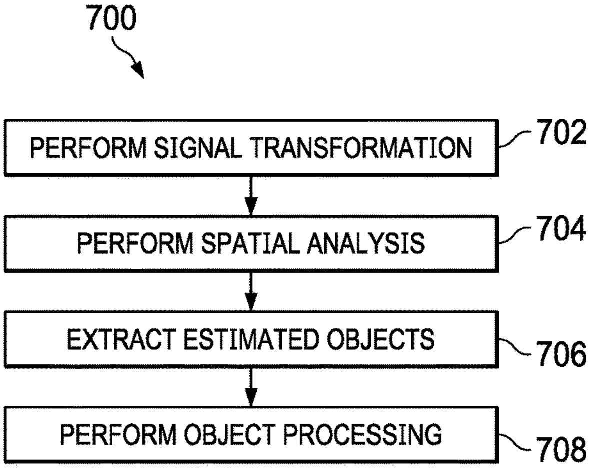
FIG. 7 is a flowchart of a method 700 of audio processing.

FIG. 7 is a flowchart of a method 700 of audio processing. The method 700 may be performed by a device, e.g. a laptop computer, a mobile telephone, etc., with the components of the architecture 600 of FIG. 6, to implement the functionality of the audio processing system 100 (see FIG. 1), one or more of the object processing systems described herein (e.g., 208 in FIG. 2, 308 in FIG. 3A, 358 in FIG. 3B, 408 in FIG. 4, 508 in FIG. 5, etc.), etc., for example by executing one or more computer programs.

At 702, signal transformation is performed on a binaural signal. Performing the signal transformation includes transforming the binaural signal from a first signal domain to a second signal domain, and generating a transformed binaural signal. The first signal domain may be a time domain and the second signal domain may be a frequency domain. For example, the signal transformation system 102 (see FIG. 1) may transform the binaural signal 120 to generate the transformed binaural signal 122.

At 704, spatial analysis is performed on the transformed binaural signal. Performing the spatial analysis includes generating estimated rendering parameters, where the estimated rendering parameters include level differences and phase differences. For example, the spatial analysis system 104 (see FIG. 1) performs spatial analysis on the transformed binaural signal 122 to generate the estimated rendering parameters 124.

At 706, estimated objects are extracted from the transformed binaural signal using at least a first subset of the estimated rendering parameters. Extracting the estimated objects includes generating a left main component signal, a right main component signal, a left residual component signal, and a right residual component signal. For example, the object extraction system 106 (see FIG. 1) may perform object extraction on the transformed binaural signal 122 using one or more of the estimated rendering parameters 124 to generate the estimated objects 126. The estimated objects 126 may correspond to component signals such as the left main component signal 220, the right main component signal 222, the left residual component signal 224, the right residual component signal 226 (see FIG. 2), the component signals 320, 322, 324 and 326 of FIG. 3, etc.

At 708, object processing is performed on the estimated objects using at least a second subset of the plurality of estimated rendering parameters. Performing the object processing includes generating a processed signal based on the left main component signal, the right main component signal, the left residual component signal, and the right residual component signal. For example, the object processing system 108 (see FIG. 1) may perform object processing on the estimated objects 126 using one or more of the estimated rendering parameters 124 to generate the processed signal 128. As another example, the processing system 208 (see FIG. 2) may perform object processing on the component signals 220, 222, 224 and 226 using one or more of the estimated rendering parameters 124 and the object processing parameters 230 and 232.

The method 700 may include additional steps corresponding to the other functionalities of the audio processing system 100, one or more of the object processing systems 108, 208, 308, etc. as described herein. For example, the method 700 may include receiving sensor data, headtracking data, etc. and performing the processing based on the sensor data or headtracking data. As another example, the object processing (see 708) may include processing the main components using one set of processing parameters, and processing the residual components using another set of processing parameters. As another example, the method 700 may include performing an inverse transformation, performing time domain processing on the inverse transformed signal, etc.

Implementation Details

An embodiment may be implemented in hardware, executable modules stored on a computer readable medium, or a combination of both, e.g. programmable logic arrays, etc. Unless otherwise specified, the steps executed by embodiments need not inherently be related to any particular computer or other apparatus, although they may be in certain embodiments. In particular, various general-purpose machines may be used with programs written in accordance with the teachings herein, or it may be more convenient to construct more specialized apparatus, e.g. integrated circuits, etc., to perform the required method steps. Thus, embodiments may be implemented in one or more computer programs executing on one or more programmable computer systems each comprising at least one processor, at least one data storage system, including volatile and non-volatile memory and/or storage elements, at least one input device or port, and at least one output device or port. Program code is applied to input data to perform the functions described herein and generate output information. The output information is applied to one or more output devices, in known fashion.

Each such computer program is preferably stored on or downloaded to a storage media or device, e.g., solid state memory or media, magnetic or optical media, etc., readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. Software per se and intangible or transitory signals are excluded to the extent that they are unpatentable subject matter.

Aspects of the systems described herein may be implemented in an appropriate computer-based sound processing network environment for processing digital or digitized audio files. Portions of the adaptive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof.

One or more of the components, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical, non-transitory, non-volatile storage media in various forms, such as optical, magnetic or semiconductor storage media.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A computer-implemented method of audio processing, the method comprising:

performing signal transformation on a binaural signal, said binaural signal being a binaural rendition or a binaural capture, wherein performing the signal transformation includes:

transforming the binaural signal from a first signal domain to a second signal domain; and generating a transformed binaural signal, wherein the first signal domain is a time domain and the second signal domain is a frequency domain wherein the signal transformation is a time-frequency transform, and wherein the transformed binaural signal comprises a plurality of time-frequency tiles transformed over a given time period;

performing spatial analysis on each of the plurality of time-frequency tiles of the transformed binaural signal, wherein performing the spatial analysis includes generating a plurality of estimated rendering parameters, wherein a given time-frequency tile of the plurality of time-frequency tiles is associated with a given subset of the plurality of estimated rendering parameters, wherein the plurality of estimated rendering parameters includes a plurality of level differences and a plurality of phase differences, and wherein the plurality of estimated rendering parameters corresponds to at least one of head-related transfer functions, head-related impulse responses, and binaural room impulse responses used the during binaural rendition or present in the binaural capture;

generating a plurality of objects from the transformed binaural signal using at least a first subset of the plurality of estimated rendering parameters, wherein the objects are represented by a respective left main component signal, a right main component signal, a left residual component signal, and a right residual component signal for each respective time-frequency tile of the transformed binaural signal; and performing object processing on the plurality of objects using at least a second subset of the plurality of estimated rendering parameters, wherein performing the object processing includes generating a processed signal based on the left main component signal, the right main component signal, the left residual component signal, and the right residual component signal, wherein the object processing includes at least one of repositioning, level adjustment, equalization, dynamic range adjustment, de-essing, multi-band compression, immersiveness improvement, envelopment, upmixing, conversion, channel remapping, storage, and archival.

2. The method of claim 1, wherein generating the processed signal includes:

generating a left main processed signal and a right main processed signal from the left main component signal and the right main component signal using a first set of object processing parameters; and generating a left residual processed signal and a right residual processed signal from the left residual component signal and the right residual component signal using the second set of object processing parameters, wherein the second set of object processing parameters differs from the first set of object processing parameters, and wherein the object processing comprises using the left main processed signal, the right main processed signal, the left residual processed signal and the right residual processed signal.

3. The method of claim 1, further comprising:

receiving sensor data from a sensor, wherein the sensor is a component of at least one of a headset, headphones, an earbud and a microphone, wherein performing the object processing includes generating the processed signal based on the sensor data.

4. The method of claim 1, wherein performing the object processing includes:

applying binaural panning to the left main component signal and to the right main component signal based on sensor data, wherein applying the binaural panning includes generating a left main processed signal and a right main processed signal; and generating a left residual processed signal and a right residual processed signal from the left residual component signal and the right residual component signal without applying the binaural panning.

5. The method of claim 1, wherein performing the object processing includes:

generating a monaural object from the left main component signal and the right main component signal;

applying binaural panning to the monaural object based on sensor data; and generating a left residual processed signal and a right residual processed signal from the left residual component signal and the right residual component signal without applying the binaural panning.

6. The method of claim 1, wherein performing the object processing includes:

generating a multi-channel output signal from the left main component signal, the right main component signal, the left residual component signal and the right residual component signal, wherein the multi-channel output signal includes at least one left channel and at least one right channel, wherein the at least one left channel includes at least one of a front left channel, a side left channel, a rear left channel and a left height channel, and wherein the at least one right channel includes at least one of a front right channel, a side right channel, a rear right channel and a right height channel.

7. The method of claim 1, wherein performing the object processing includes:

applying speech improvement processing to the left main component signal and to the right main component signal, wherein applying the speech improvement includes generating a left main processed signal and a right main processed signal; and generating a left residual processed signal from the left residual component signal and a right residual processed signal from the right residual component signal without applying the speech improvement processing.

8. The method of claim 1, wherein generating the processed signal includes:

applying level adjustment to the left main component signal and to the right main component signal using a first level adjustment value, wherein applying the level adjustment includes generating a left main processed signal and a right main processed signal; and applying level adjustment to the left residual component signal and to the right residual component signal using a second level adjustment value, wherein applying the level adjustment includes generating a left residual processed signal and a right residual processed signal, and wherein the second level adjustment value differs from the first level adjustment value, and wherein the object processing comprises using the left main processed signal, the right main processed signal, the left residual processed signal and the right residual processed signal.

9. The method of claim 1, wherein the plurality of phase differences is a plurality of unwrapped phase differences, wherein the plurality of unwrapped phase differences is unwrapped by performing at least one of evidence-based unwrapping and model-based unwrapping.

10. The method of claim 9, wherein performing the evidence-based unwrapping includes:

estimating, in each band, a total energy of the left main component signal and the right main component signal;

computing a cross-correlation based on each band; and selecting the plurality of unwrapped phase differences from a plurality of candidate phase differences according to an energy across neighboring bands based on the cross-correlation.

11. The method of claim 9, wherein performing the model-based unwrapping includes:

selecting the plurality of unwrapped phase differences from a plurality of candidate phase differences according to a given level difference applied to a head-related transfer function for a given band.

12. The method of claim 1, wherein a given phase difference of the plurality of phase differences is calculated as a phase angle of an inner product of a left component of the transformed binaural signal and a right component of the transformed binaural signal, for a given index in the second signal domain.

13. The method of claim 1, wherein a given level difference of the plurality of level differences is computed according to a quadratic equation based on a left component of the transformed binaural signal, a right component of the transformed binaural signal, and a given phase difference of the plurality of phase differences.

14. The method of claim 1, further comprising:

performing inverse signal transformation on the left main processed signal, the right main processed signal, the left residual processed signal and the right residual processed signal to generate a processed signal, wherein the processed signal is in the first signal domain.

15. The method of claim 1, further comprising:

performing time domain processing on the processed signal, wherein performing time domain processing includes generating a modified time domain signal.

16. A non-transitory computer readable medium storing a computer program that, when executed by a processor, controls an apparatus to execute processing including the method of claim 1.

17. An apparatus for audio processing, the apparatus comprising:

a processor and optionally a sensor, wherein the processor is configured to control the apparatus to execute processing including the method of claim 1.

* * * * *